2,823,201

HALOGENATED POLYMERS OF NUCLEAR METH-YLATED AROMATIC HYDROCARBONS, THEIR QUATERNARY AMMONIUM SALTS AND METH-OD OF MAKING THE SAME

Robert M. Wheaton, Midland, Mich., assignor to The Dow Chemical Company, Midland, Mich., a corporation of Delaware No Drawing. Application March 10, 1952
Serial No. 275,862

11 Claims. (Cl. 260—93.5)

This invention concerns certain new derivatives of polymers of ar-methyl-monovinyl aromatic hydrocarbons. It relates more particularly to halogenated polymers of ar-methyl-styrenes and water-soluble aminated derivatives thereof containing quaternary ammonium groups. The invention also concerns a method of making the new compositions.

The new halogenated polymers are soluble in organic solvents such as benzene, toluene, xylene, ethylbenzene, dioxane, carbon tetrachloride, chloroform, tetrachloroethane, chlorobenzene or ortho-dichlorobenzene. They all contain halomethyl groups on aromatic nuclei thereof, e. g. monochloromethyl groups attached to carbon atoms of aromatic nuclei in the polymer. The halogen atom of such monohalomethyl groups may be displaced with other groups or radicals such as hydroxyl, ammonium, or primary-, secondary-, or tertiary-amino radicals, to form the corresponding derivatives of the halogenated polymers. The halogenated polymers are useful as intermediates for the production of such other polymer derivatives. The halogenated polymers are particularly suitable as intermediates for making water-soluble resinous compositions containing quaternary ammonium groups, i. e. a water-soluble resinous product which is a quaternary ammonium base, or a salt thereof, by reaction of the halogenated polymer with a tertiary amine. The water-soluble resinous compositions containing quaternary ammonium groups are useful as precipitating or flocculating agents for removing soluble acidic substances, e. g. colored substances, from aqueous solutions of sucrose. They are also useful in the preparation of colloidal solutions of metals, or salts thereof, e. g. silver chloride.

The polymers to be employed as starting materials in preparing the compositions of the invention are the benzene-soluble polymers of one or more ar-methyl-monovinyl aromatic hydrocarbons of the benzene series, having the vinyl radical and from one to three methyl radicals directly attached to carbon atoms of the aromatic nucleus. Examples of suitable starting materials are the polymers of ortho-methylstyrene, meta-methylstyrene, para-methylstyrene, ar-dimethylstyrene, or ar-trimethylstyrene. Copolymers of any two or more of such ar-methyl-monovinyl aromatic hydrocarbons with each other, or copolymers of the ar-methyl-monovinyl aromatic hydrocarbons and 10 percent by weight or less of styrene may also be used. The polymeric starting materials are normally solid polymers having a molecular weight greater than 30,000, preferably a molecular weight of from 50,000 to 150,000 as determined by the well known Staudinger viscosity method. Polymers, and copolymers of any two or more, of the monomeric ar-methyl-monovinyl aromatic hydrocarbons may be prepared by usual polymerization methods. For instance, the monomeric ar-methyl-monovinyl aromatic hydrocarbons such as meta-methylstyrene, or para-methylstyrene, may be polymerized by heating the same, e. g. at temperatures of from 70° to 150° C., in mass and in the presence or absence of a polymerization catalyst such as benzoyl peroxide, di-tertiarybutyl peroxide, or tertiary-butyl hydroperoxide. Polymerization of the monomeric ar-methyl-monovinyl aromatic hydrocarbons may also be carried out in aqueous emulsions which contain polymerization catalysts such as hydrogen peroxide, potassium persulfate, or ammonium persulfate.

The halogenated polymeric products are prepared by reacting chlorine or bromine with the polymers or copolymers in the presence of a halogenation catalyst such as phosphorus trichloride, phosphorus pentachloride, ultraviolet light, or a combination of phosphorus trichloride and ultraviolet light, which catalyst promotes the substitution of halogen on carbon atoms of the methyl radicals in the polymer. The halogenation reaction is carried out while the polymer is dissolved in an organic liquid which is less reactive with the chlorine or bromine than is the polymer. A wide variety of such organic liquids are known. Examples of suitable organic liquids are carbon tetrachloride, monochlorobenzene, orthodichlorobenzene, chloroform, tetrachloroethane, perchloroethylene, or acetic acid. The organic liquid is preferably used in amount such as to form a solution containing from 5 to 10 percent by weight of the polymer. The halogenation reaction may be carried out at temperatures between 0° and 150° C., preferably from 20° to 100° C., and at atmospheric pressure, although superatmospheric pressures of from 2 to 25 pounds per square inch gauge pressure or higher may be used.

The halogenation reaction is preferably carried out while the polymer is dissolved in an inert organic solvent such as carbon tetrachloride, or chloroform, and with agitation to provide a uniform temperature throughout the reaction mixture. The reaction to substitute a chlorine or bromine atom on a methyl radical in the polymeric starting material is usually accompanied, at least to some extent, by the substitution of halogen atoms on aromatic nuclei of the polymer and also by the substitution of halogen atoms on carbon atoms of the polymer chain. The portion of the chlorine or bromine which is substituted on carbon atoms in the aromatic nuclei of the polymer is non-reactive with tertiary amines to form quaternary ammonium groups.

The polymer is usually reacted with from 0.4 to 2, preferably from 0.5 to 1.8, molecular proportions of chlorine or bromine for each methyl radical in the polymer. The halogenated polymers are soluble in toluene, i. e. they are linear polymers substantially free from methylene cross-linkages, and they contain an average of from 0.3 to 1.4 side chain halogen atoms per methyl radical in the polymer.

The halogenated polymer may be recovered from the solution in which it is prepared in any usual way, e. g., the crude reaction mixture may be mixed with a lower aliphatic alcohol such as methanol, ethanol, or isopropanol, to precipitate the polymer, after which the polymer is separated, washed and dried. Alternatively, the halogenated polymer may be recovered by evaporating the solvent at room temperature, or by heating, preferably in vacuum, to vaporize and separate the solvent from the halogenated polymeric product. The halogenated polymer may be reacted with a tertiary amine to form a corresponding derivative, e. g. a water-soluble resinous quaternary ammonium halide, in the presence or absence of a solvent for the polymer.

The water-soluble resinous compositions containing quaternary ammonium groups are prepared by reacting a tertiary amine with the halogenated polymer in a liquid medium, e. g. by using an aqueous solution of the tertiary amine, whereby the halogen atom of the monohalomethyl groups, i. e. a side chain halogen atom, is replaced with a nitrogen atom of the tertiary amine.

The tertiary amine reactant is preferably a tertiary alkyl amine or a mixed alkyl-alkanol amine such as trimethylamine, or dimethylethanolamine, although tertiary amines of the acyclic, carbocyclic, or heterocyclic, series may be used. Examples of suitable tertiary amines are trimethylamine, triethylamine, tripropylamine, tributylamine, dimethylethanolamine, methyl - di - isopropanolamine, benzyldimethylamine, dimethylaniline, or pyridine. Mixtures of any two or more of such tertiary amines may also be used. At least one molecular proportion of one or more of the tertiary amines is employed for each side chain chlorine or bromine atom in the polymer, i. e. for each monohalomethyl group on aromatic nuclei in the halogenated polymer. The tertiary amine may be used in excess of the minimum proportion just stated. In general, from one to three molecular proportions of the tertiary amine are used per monohalomethyl group on aromatic nuclei in the halogenated polymer. The tertiary amine is employed in amount corresponding to at least one mole of the tertiary amine for each side chain chlorine or bromine atom in the halogenated polymer.

The reaction of a teriary amine with the halogenated polymer may be carried out at temperatures between 20° and 100° C., and at atmospheric or superatmospheric pressure. The reaction may be carried out in the presence of an organic liquid which is a solvent for the halogenated polymer and the tertiary amine. Examples of such media are carbon tetrachloride, dioxane, toluene, or xylene. The amination reaction is usually carried out by dispersing granules of the halogenated polymer in a liquid medium such as water, acetone, or ethyl alcohol, containing the tertiary amine. The reaction may be carried out employing a large excess of the tertiary amine in which case no other liquid medium need be used. In practice, the halogenated polymer is mixed with the tertiary amine, or a solution of the tertiary amine, e. g. an aqueous solution of the tertiary amine in concentration of from 20 to 50 percent by weight, in amount corresponding to at least one mole of the tertiary amine per side chain halogen atom in the polymer. The mixture is preferably agitated and maintained at a reaction temperature until the halogen atom of each monohalomethyl group on aromatic nuclei in the polymer is replaced by a nitrogen atom of the tertiary amine.

The resinous aminated product containing quaternary ammonium groups is recovered from the reaction mixture by evaporating the latter, suitably in vacuum at temperatures below 110° C., to remove the water, together with excess tertiary amine and other volatile substances. The product is obtained in the form of a resinous quaternary ammonium salt, e. g. a resinous quaternary ammonium halide.

The following examples illustrate ways in which the principle of the invention has been applied, but are not to be construed as limiting the invention.

EXAMPLE 1

In each of a series of experiments, a polymer of isomeric ar-methylstyrenes having a viscosity characteristic of 24.2 centipoises (for a 10 weight percent solution of the polymer in toluene at 25° C.) and containing in chemically combined form, approximately 70 percent by weight of meta-methylstyrene and 30 percent of para-methylstyrene, in amount as stated in the following table, was dissolved in carbon tetrachloride to form a solution containing 5 percent by weight of the polymer. The solution was placed in a glass reaction flask equipped with a reflux condenser and stirrer. It was stirred and exposed to rays of an AH4-100 mercury vapor lamp placed adjacent to one side of the vessel while introducing gaseous chlorine into the liquid at temperatures between 50° and 58° C., in amount as stated in the table. The solution of the chlorinated polymer was poured into a shallow dish and the solvent allowed to evaporate at room temperature. A solid residue was obtained. A portion of the residue was dissolved in dioxane. The solution was mixed with methyl alcohol to precipitate the chlorinated polymer. The polymer was separated from the liquid by filtering and was washed with methyl alcohol and dried. The purified chlorinated polymer was analyzed for percent side chain chlorine and nuclear chlorine. A portion of the crude chlorinated product was mixed with an aqueous 25 weight percent solution of trimethylamine in proportions corresponding to one part by weight of the crude chlorinated polymer per four parts by weight of the aqueous trimethylamine solution. The mixture was stirred and gradually heated from room temperature to 100° C., over a period of 2 hours. Thereafter the mixture was diluted with 250 cc. of water and was heated to boiling to distill the excess trimethylamine, and the carbon tetrachloride occluded in the chlorinated polymer starting material, from the aqueous solution. The liquid residue was cooled to room temperature and the solubility of the aminated product in the aqueous liquid observed. The table identifies each chlorinated polymeric product by giving the parts by weight of the polymer starting material and of chlorine employed in preparing the same. The table gives the molecular proportion of chlorine reacted with the polymer per methyl radical therein, and the percent by weight of side chain chlorine, nuclear chlorine and total chlorine determined for each chlorinated polymer. The table also gives the proportion or ratio of side chain chlorine atoms to methyl radicals in the chlorinated polymer and gives the solubility in water which was observed for each aminated product, i. e. the reaction product of the chlorinated polymer and the trimethylamine. For purpose of comparison examples of chlorinated polymeric products and aminated derivatives thereof which are outside the scope of the invention are included in the table.

Table

| Run No. | Starting Materials | | Chlorinated Polymeric Product | | | | | Aminated Polymeric Product |
|---|---|---|---|---|---|---|---|---|
| | Polymer of ar-methylstyrenes, gms. | Chlorine, gms. | Mole of Cl² reacted per methyl radical in the polymer | Percent side chain chlorine | Percent nuclear chlorine | Percent total chlorine | Side chain chlorine atom per methyl radical in the polymer | Solubility in water |
| 1 | 57.2 | 10 | 0.30 | 6.2 | 2.2 | 8.4 | 0.22 | Insoluble. |
| 2 | 56.6 | 13.5 | 0.48 | 8.5 | 4.2 | 12.7 | 0.31 | Soluble. |
| 3 | 47.9 | 29 | 1.15 | 16.2 | 6.9 | 23.1 | 0.70 | Do. |
| 4 | 59.3 | 107 | 1.80 | 25.6 | 9.9 | 35.5 | 1.30 | Do. |
| 5 | 59.0 | 177 | 2.70 | 38.8 | 6.2 | 45.0 | 2.30 | Insoluble. |

EXAMPLE 2

Sixty grams of the polymer of ar-methylstyrenes described in Example 1 was dissolved in 1140 grams of carbon tetrachloride. The solution was placed in a glass reaction vessel equipped with a reflux condenser and stirrer. The solution was stirred and exposed to the rays of an AH4-100 mercury vapor lamp placed adjacent to one side of the reaction vessel while adding 81 grams of bromine, at an average rate of 2.5 grams of the bromine per minute, to the solution. The temperature of the solution increased from room temperature to 57° C. during the bromination. The solution was poured into a shallow dish and the solvent allowed to evaporate at room temperature. A portion of the residue was dissolved in dioxane. The brominated polymer was precipitated by mixing the solution with methyl alcohol. The polymer was separated by filtering and was washed and dried. It was analyzed and found to contain 34.6 percent by weight of side chain bromine and 1.7 percent of nuclear bromine. Total bromine was 36.3 percent. The product was soluble in toluene. The brominated polymer contained an average of 0.86 side chain bromine atom per methyl radical in the polymer.

EXAMPLE 3

Fifty grams of the air dried brominated polymer of ar-methylstyrenes prepared in Example 2, together with 400 cc. of an aqueous 12.5 weight percent solution of trimethylamine was gradually heated to boiling over a period of two hours. A clear brown solution was obtained. The solution was boiled to remove the excess trimethylamine, and the carbon tetrachloride occluded in the polymeric starting material, together with a small portion of the water. The remaining solution was poured into a shallow dish and evaporated to a solid by heating at a temperature of 75° C. There was obtained 44 grams of a polymeric quaternary ammonium bromide as a clear brown solid. It was analyzed and found to contain 3.92 percent by weight of nitrogen, 16.4 percent of ionic bromine and 5.5 percent of water.

EXAMPLE 4

A charge of 12.5 grams of a granular polymer of dimethylstyrene was dissolved in approximately 200 cc. of carbon tetrachloride. The solution was placed in a glass reaction flask equipped with a reflux condenser and stirrer. The solution was stirred and 1 cc. of phosphorus trichloride added thereto as catalyst. The solution was exposed to rays of an AH4–100 mercury vapor lamp placed adjacent to one side of the reaction vessel, and was maintained at a reflux temperature while introducing 27 grams of chlorine gas into the liquid over a period of 25 minutes. The chlorinated product was recovered by evaporating the solvent in vacuum. The residue was crushed to a granular form and was mixed with approximately 100 cc. of an aqueous 25 weight percent solution of trimethylamine. The mixture was gradually heated from room temperature to 100° C. over a period of about two hours. The solution was boiled to remove the excess trimethylamine. A clear yellow solution was obtained.

EXAMPLE 5

A charge of 50 grams of the polymer of ar-methylstyrenes described in Example 1, was dissolved in 958 grams of carbon tetrachloride to form a solution containing approximately 5 percent by weight of the polymer. The solution was placed in a glass reaction flask equipped with a reflux condenser and stirrer. The solution was stirred and exposed to the rays of an AH4–100 mercury vapor lamp placed adjacent to one side of the glass reaction vessel, while introducing 30 grams of chlorine gas into the liquid at temperatures between 25° and 58° C., over a period of 23 minutes. The solution was poured into a shallow pan and the solvent allowed to evaporate at room temperature. The residue was dissolved in 400 cc. of dioxane. This solution was admixed with approximately 3000 cc. of vigorously stirred methyl alcohol to precipitate the chlorinated polymer. The polymer was separated by filtering, was washed with methanol and was dried in vacuum at a temperature of 60° C. for a period of 2 hours. There was obtained 53 grams of the chlorinated product as a white fibrous material. It was analyzed and found to contain 17.6 percent by weight of side chain chlorine and 7.5 percent of nuclear chlorine. Total chlorine was 25.1 percent by weight. The chlorinated polymer was soluble in toluene. A 10 weight percent solution of the chlorinated polymer in toluene had an absolute viscosity of 6.9 centipoises at 25° C. The product contained an average of 0.77 side chain chlorine atom per methyl radical in the polymer.

EXAMPLE 6

A charge of 3.5 grams of the chlorinated polymer of Example 5, together with 100 cc. of an aqueous 25 weight percent solution of trimethylamine, was sealed in a glass bottle and allowed to stand at room temperature over a period of 3 days. A clear solution was obtained. It was removed from the bottle and was boiled to remove the excess trimethylamine. The solution was evaporated to a solid by heating at a temperature of 55° C. There was obtained 5.8 grams of a polymeric quaternary ammonium halide as a clear amber solid.

EXAMPLE 7

Fifty-four grams of the polymer of ar-methylstyrenes described in Example 1, was dissolved in 1023 grams of carbon tetrachloride. The solution was placed in a glass reaction vessel equipped with a reflux condenser and stirrer. It was stirred and exposed to the rays of an AH4–100 mercury vapor lamp placed adjacent to one side of the vessel while passing 16 grams of gaseous chlorine into the liquid over a period of 6 minutes. The temperature of the reaction mixture increased from room temperature to 57° C. during the chlorination. The solution of the chlorinated polymer was poured into a shallow vessel and the solvent allowed to evaporate at room temperature. The residue was a clear brittle solid containing occluded carbon tetrachloride. A portion of the residue was dissolved in dioxane. The polymer was precipitated with alcohol. It was separated from the liquid by filtering, was washed with alcohol and dried in vacuum at a temperature of 50° C. for a time of 2 hours. The purified product was analyzed and found to contain 11.1 percent by weight of side chain chlorine and 3.9 percent of nuclear chlorine. Total chlorine was 15.0 percent by weight. It was soluble in toluene. The chlorinated polymer contained an average of 0.42 side chain chlorine atom per methyl radical in the polymer.

EXAMPLE 8

Fifty grams of the air dried chlorinated polymeric product of Example 7, containing some occluded carbon tetrachloride solvent, was mixed with 200 cc. of an aqueous 25 weight percent solution of trimethylamine. The mixture was placed in a glass reaction flask equipped with a reflux condenser and stirrer. It was stirred. The temperature of the mixture was gradually increased from room temperature to 100° C., over a period of 2 hours. Thereafter, 250 cc. of water was added to the mixture and stirring and heating was continued. A clear yellow solution was obtained. The reflux condenser was removed and the solution was boiled to remove the excess trimethylamine, and the carbon tetrachloride, together with a portion of the water. The remaining solution was poured into a shallow dish and evaporated to a solid by heating at a temperature of 75° C. There was obtained 38 grams of a resinous quaternary ammonium chloride as a brittle yellow water-soluble solid. The product was analyzed and found to contain 2.6 percent by weight of nitrogen, 6.8 percent of ionic chloride and 6.2 percent of water. Ten grams of the aminated product was dissolved in 90 grams of distilled water. The solution had an absolute viscosity of 3.57 centipoises at 25° C.

EXAMPLE 9

A purpose of this example is to illustrate a property of the resinous water-soluble compositions containing a quaternary ammonium halide groups to precipitate colored substances from aqueous solutions of sucrose. The concentration of colored impurities in the solution was determined, both before and after the treatment to precipitate and remove such impurities, by a standard light absorption test. In this test a layer of the solution of known depth, or thickness, is exposed to light of a standard intensity and having a wave length of 620 millimicrons. From the difference between the intensity of the transmitted light and that of the light to which the solution is exposed, the percent of the light absorbed by the solution is calculated. The sucrose solution employed in this test was prepared by dissolving 50 grams of light molasses in 120 grams of distilled water. It had a light absorption value of 91 percent. To this solution there was added 20 cc. of an aqueous solution containing 5 percent by weight of a resinous water-soluble quaternary ammonium chloride, prepared by procedure similar to that described in Example 8. A flocculent brown precipitate was formed. The solution was filtered. The filtrate, i. e. the treated molasses solution, had a light absorption value of only 71 percent.

EXAMPLE 10

A solution of 48 grams of the polymer of ar-methylstyrenes described in Example 1, and 912 grams of carbon tetrachloride was placed in a glass reaction vessel equipped with a reflux condenser and stirrer. The solution was stirred and exposed to rays of a mercury vapor lamp placed adjacent to one side of the vessel. Twenty-nine grams of gaseous chlorine, was passed into the solution at an average rate of about one gram per minute while maintaining the solution at temperatures between 20° and 25° C. Hydrogen chloride formed in the reaction was vented through the reflux condenser. The solution was poured into a shallow dish and the solvent allowed to evaporate at room temperature. A solid residue was obtained. A portion of the chlorinated polymer was dissolved in dioxane. The solution was mixed with methyl alcohol to precipitate the polymer. The polymer was separated from the liquid by filtering and was washed and dried. The purified product was analyzed and found to contain 17.9 percent by weight of side chain chlorine and 7.8 percent of nuclear chlorine. The chlorinated product was soluble in toluene. It contained an average of 0.8 side chain chlorine atom per methyl radical in the polymer.

EXAMPLE 11

Fifty grams of the air dried chlorinated polymer of ar-methylstyrenes of Example 10 containing a small amount of occluded carbon tetrachloride, was mixed with 200 cc. of an aqueous 25 weight percent solution of trimethylamine. The mixture was placed in a glass reaction flask equipped with a reflux condenser and stirrer. It was stirred and gradually heated from room temperature to 100° C., over a period of 2 hours. The reflux condenser was removed. The mixture was boiled for about 10 minutes to remove excess trimethylamine and the carbon tetrachloride occluded in the polymer starting material, together with a portion of the water. There was obtained a clear yellow solution. It was poured into a shallow dish and evaporated to a solid by heating at a temperature of 75° C. There was obtained 37 grams of a resinous composition containing quaternary ammonium chloride groups as a brittle yellow solid. It was soluble in water. The product was analyzed and found to contain 4.4 percent by weight of nitrogen, 10.4 percent of ionic chloride and 8 percent of water.

EXAMPLE 12

A solution of 46 grams of the polymer of ar-methylstyrenes described in Example 1, and 879 grams of monochlorobenzene was placed in a glass reaction vessel equipped with a reflux condenser and stirrer. The solution was stirred and heated to a temperature of 100° C. Two cubic centimeters of phosphorus trichloride was added thereto as catalyst. Thereafter, 28 grams of gaseous chlorine was passed into the liquid at a temperature of 100° C. over a period of thirty minutes. The solution was poured into a shallow dish and the solvent allowed to evaporate at room temperature. A solid residue was obtained. A portion of the residue was dissolved in dioxane and the chlorinated polymer precipitated by pouring the solution into methyl alcohol. The product was separated by filtering, was washed with methyl alcohol and was dried. It was analyzed and found to contain 10.3 percent by weight of side chain chlorine and 9.0 percent of nuclear chlorine. The chlorinated polymer was soluble in toluene. It contained an average of 0.4 side chain chlorine atom per methyl radical in the polymer.

EXAMPLE 13

Fifty grams of the crude chlorinated polymer, i. e. the residue obtained by allowing the solution of the chlorinated polymer of ar-methylstyrenes and chlorobenzenes to evaporate at room temperature as described in Example 12, was mixed with 200 cc. of an aqueous 25 weight percent solution of trimethylamine. The mixture was placed in a glass reaction vessel equipped with a reflux condenser and stirrer. It was stirred. The temperature of the mixture was gradually increased from room temperature to 100° C., over a period of 2 hours. The reflux condenser was removed and the solution was boiled for about 15 minutes to distill excess trimethylamine, and monochlorobenzene which was occluded in the chlorinated polymer starting material, together with a portion of the water, from the solution of the aminated product. There was obtained a clear yellow solution. It was poured into a shallow dish and evaporated to a solid by heating at a temperature of 75° C. There was obtained 44 grams of a resinous quaternary ammonium chloride as a brittle yellow solid. It was analyzed and found to contain 3 percent by weight of nitrogen, 6.8 percent of ionic chlorine and 6.7 percent of water.

I claim:

1. A method which comprises reacting a halogen selected from the group consisting of chlorine and bromine, with a benzene-soluble polymer comprised essentially of a polymerized ar-methyl-monovinyl aromatic hydrocarbon of the benzene series having the vinyl radical and from one to three methyl radicals directly attached to carbon atoms of the aromatic nucleus, in the presence of a halogenation catalyst promoting the substitution of halogen in the methyl radicals, while the polymer is dissolved in an inert organic liquid at a temperature between 0° and 150° C., until the polymer contains an average of from 0.3 to 1.4 side chain halogen atoms per methyl radical in the polymer whereby a toluene-soluble polymeric product containing at least to some extent nuclear halogenation is obtained and reacting the halogenated polymer with a tertiary amine to obtain a water-soluble resinous composition containing quaternary ammonium groups.

2. A method of making a water-soluble resinous composition containing quaternary ammonium groups which comprises reacting a toluene-soluble halogenated polymer comprised essentially of a polymerized ar-methyl-monovinyl aromatic hydrocarbon of the benzene series having the vinyl radical and from one to three methyl radicals directly attached to carbon atoms of the aromatic nucleus, which halogenated polymer contains at least to some extent nuclear halogenation and an average of from 0.3 to 1.4 side chain halogen atoms selected from the group consisting of chlorine and bromine, per methyl radical in the polymer, with a tertiary amine by maintaining a mixture comprising the reactants in amounts corresponding to at least one mole of the tertiary amine per side chain halogen atom in the polymer at a reaction temperature between 20° and 100° C.

3. A method of making a water-soluble resinous composition containing quaternary ammonium groups which comprises reacting a toluene-soluble chlorinated polymer comprised essentially of a polymerized ar-methyl-monovinyl aromatic hydrocarbon of the benzene series having the vinyl radical and from one to three methyl radicals directly attached to carbon atoms of the aromatic nucleus, which chlorinated polymer contains at least to some extent nuclear chlorination and an average of from 0.3 to 1.4 side chain chlorine atoms per methyl radical in the polymer, with a tertiary amine by maintaining a mixture comprising the reactants in amounts corresponding to at least one mole of the tertiary amine per side chain chlorine atom in the polymer at a reaction temperature between 20° and 100° C.

4. A method of making a water-soluble resinous composition containing quaternary ammonium groups which comprises reacting a toluene-soluble chlorinated homo polymer of ar-methyl-styrene, which chlorinated polymer contains at least to some extent nuclear chlorination and an average of from 0.3 to 1.4 side chain chlorine atoms per methyl radical in the polymer, with a tertiary amine by maintaining a mixture comprising the reactants in amounts corresponding to at least one mole of the tertiary amine per side chain chlorine atom in the polymer at a reaction temperature between 20° and 100° C. until substantially each side chain chlorine atom in the polymer is replaced by a nitrogen atom of the tertiary amine.

5. A method of making a water-soluble resinous composition containing quaternary ammonium groups which comprises, reacting a toluene-soluble chlorinated homo polymer of ar-dimethyl-styrene, which chlorinated polymer contains at least to some extent nuclear chlorination and an average of from 0.3 to 1.4 side chain chlorine atoms per methyl radical in the polymer, with a tertiary amine by maintaining a mixture comprising the reactants in amounts corresponding to at least one mole of the tertiary amine per side chain chlorine atom in the polymer at a reaction temperature between 20° and 100° C. until substantially each side chain chlorine atom in the polymer is replaced by a nitrogen atom of the tertiary amine.

6. A water-soluble resinous composition containing quaternary ammonium groups comprising the reaction product of a tertiary amine with a halogenated polymer comprised essentially of a polymerized ar-methyl-monovinyl aromatic hydrocarbon of the benzene series having the vinyl radical and from one to three methyl radicals directly attached to carbon atoms of the aromatic nucleus, which halogenated polymer contains at least to some extent nuclear halogenation and an average of from 0.3 to 1.4 side chain halogen atoms selected from the group consisting of chlorine and bromine, per methyl radical in the polymer.

7. A water-soluble resinous composition containing quaternary ammonium groups consisting of the reaction product of a tertiary amine with a chlorinated polymer comprised essentially of a polymerized ar-methyl-monovinyl aromatic hydrocarbon of the benzene series having the vinyl radical and from one to three methyl radicals directly attached to carbon atoms of the aromatic nucleus, which chlorinated polymer contains at least to some extent nuclear chlorination and an average of from 0.3 to 1.4 side chain chlorine atoms per methyl radical in the polymer.

8. A water-soluble resinous composition containing quaternary ammonium groups consisting of the reaction product of a tertiary amine with a chlorinated homo polymer of ar-methyl-styrene, which chlorinated polymer contains at least to some extent nuclear chlorination and an average of from 0.3 to 1.4 side chain chlorine atoms per methyl radical in the polymer.

9. A water-soluble resinous composition containing quarternary ammonium groups consisting of the reaction product of a tertiary amine with a chlorinated homo polymer of ar-dimethyl-styrene, which chlorinated polymer contains at least to some extent nuclear chlorination and an average of from 0.3 to 1.4 side chain chlorine atoms per methyl radical in the polymer.

10. A water-soluble resinous composition containing quaternary ammonium groups consisting of the reaction product of trimethylamine and a chlorinated homo polymer of ar-methylstyrene, which chlorinated polymer contains at least to some extent nuclear chlorination and an average of from 0.3 to 1.4 side chain chlorine atoms per methyl radical in the polymer.

11. A water-soluble composition containing quaternary ammonium groups consisting of the reaction product of trimethylamine and a chlorinated homo polymer of ar-dimethylstyrene, which chlorinated polymer contains at least to some extent nuclear chlorination and an average of from 0.3 to 1.4 side chain chlorine atoms per methyl radical in the polymer.

References Cited in the file of this patent

UNITED STATES PATENTS

| | | |
|---|---|---|
| 2,591,573 | McBurney | Apr. 1, 1952 |
| 2,632,000 | McMaster et al. | Mar. 17, 1953 |
| 2,694,702 | Jones | Nov. 16, 1954 |

OTHER REFERENCES

Bachman et al.: J. Org. Chem., 12, pages 108, 113, 114 (1947).